3,014,032
PROCESS FOR THE MANUFACTURE OF AN UNSATURATED LACTONE
Albert Wettstein, Riehen, and Georg Anner and Karl Heusler, Basel, Switzerland, assignors to Ciba Pharmaceutical Products Inc., Summit, N.J., a corporation of New Jersey
No Drawing. Filed Jan. 16, 1961, Ser. No. 82,723
Claims priority, application Switzerland July 21, 1960
3 Claims. (Cl. 260—239.57)

The present invention relates to a process for the manufacture of an 18:20 lactone of a $\Delta^4$-3-oxo-11α-acyloxy-20-hydroxy-pregnene-18-acid from an 18:20-lactone of a 3-oxo-11α-acyloxy-20-hydroxy-5α-pregnane-18-acid.

The introduction of a 4:5-double bond in 3-ketones of 5α-steroids, that is to say of steroids of the allo series, is of great industrial importance, since, for example, all natural suprarenal cortex hormones, such as cortisone, hydrocortisone, corticosterone and aldosterone have a $\Delta^4$-3-oxo group. On the other hand, the allo steroids are very readily accessible in nature and, among these, the degradation products of the sapogenins, for example of tigogenin and of hecogenin are particularly suitable for the preparation of corticoids and related compounds. For this reason various processes for the introduction of a 4:5-double bond in 5α-steroids have been described. These consist in first preparing from a 3-oxo-5α-steroid a 2:2-dibromide, rearranging the latter under acidic conditions, for example under the influence of hydrobromic acid, to a 2:4-dibromide, then preparing a 2-iodo-4-bromo-derivative by treatment with potassium iodide, splitting off the 4-positioned bromine with the formation of a 4:5-double bond and finally removing the 2-iodine atom by reduction. This process comprises many steps and is complicated, and gives satisfactory yields only when definite reaction conditions are observed and only with selected compounds.

It is also known that on heating 3:11:20-trioxo-2α-bromo-5α-pregnane for 2 hours in dimethylformamide with lithium chloride at 70–80° C. a crude product is obtained from which 11-keto-progesterone may be isolated in a 40.8% yield. The crude product contained in this case less than 5% of the $\Delta^1$-compound.

It has now been found that the 18:20-lactone of a $\Delta^4$-3-oxo-11α-acyloxy-20-hydroxy-pregnene-18-acid may be obtained in good yield when the 18:20-lactone of a 2-bromo-3-oxo11α-acyloxy-20-hydroxy-5α-pregnane-18-acid is heated with a lithium halide in a dialkyl formamide, for example in dimethylformamide, if desired with the addition of lithium carbonate.

It was surprisingly observed that the yield of $\Delta^4$-3-ketone from a 2-bromo-3-oxo-5α-steroid is considerably increased by the presence of an 11α-acyloxy group. In the case of the present compound it was possible to obtain a yield up to 75%. As lithium halide it is of advantage to use lithium chloride or lithium bromide and to work in a dialkyl-formamide, more especially dimethylformamide or diethylformamide, preferably at a temperature between 100 and 150° C. for 5 to 20 hours. The reaction therefore takes a much slower course than in the case of the known 11-keto compound. Surprisingly, the reaction can also be carried out in the presence of lithium carbonate, although on the basis of known processes one would assume that the rearrangement of the 2-bromide to the 4-bromide preceding elimination would only take place in the presence of an acid.

The 18:20-lactones of 3-oxo-11α-acyloxy-20-hydroxy-5α-pregnane-18-acids are readily accessible by a process described in U.S. patent application Ser. No. 74,486, filed December 8, 1960, by Charles Meystre et al., in U.S. patent application Ser. No. 74,487, filed December 8, 1960, by Charles Meystre et al. and in U.S. patent application Ser. No. 74,470, filed December 8, 1960, by Oskar Jeger et al. This process consists in reacting, for example, lead tetraacetate with a 3β:11α-diacyloxy-20-hydroxy-5α-pregnane in the presence of iodine and oxidizing the resulting product with chromium trioxide in the presence of silver chromate. By partial hydrolysis in 3-position and further oxidation the 18:20-lactone of a 3-oxo-11α-acyloxy-20-hydroxy-5α-pregnane-18-acid is obtained. The 11α-acyloxy group is particularly an ester group derived from a lower aliphatic fatty acid, for example a formate, acetate, propionate or benzoate group.

The 18:20-lactones of $\Delta^4$-3-oxo-11α-acyloxy-20-hydroxy-pregnene-18-acids obtained by the present process are important intermediates for the manufacture of aldosterone and related products. By hydrolysis of the 11α-acyloxy group and oxidation to the 11-ketone it is easy to obtain the 18:20-lactone of $\Delta^4$-3:11-dioxo-20-hydroxy-pregnene-18-acid, which upon ketalization in 3-position and reduction with sodium borohydride affords the (18→11)-lactone of a $\Delta^5$-3-alkylene-dioxy-11β:20-dihydroxy-pregnene-18-acid and after oxidation, for instance with chromium trioxide, a corresponding 20-ketone, e.g. the ketone of the formula

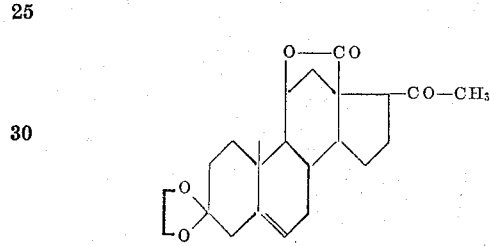

is obtained, whose further conversion into aldosterone is already known.

The following examples illustrate the invention.

*Example 1*

907 mg. of crystalline 18:20-lactone of 2-bromo-3-oxo-11α-acetoxy-20β-hydroxy - 5α-pregnane - 18 - acid are heated at 100° C. in a solution of lithium chloride in dimethylformamide of 10% strength for 12 hours under nitrogen. The mixture is cooled, poured into 150 ml. of water and extracted with methylene chloride. The extracts are washed several times with water, dried and evaporated to yield 862 mg. of a crude product which crystallizes easily with ether and which is purified by chromatography on 25 grams of aluminum oxide. The first benzene fraction contains 211 mg. of pure 18:20-lactone of 2-bromo-3-oxo-11α-acetoxy-20β-hydroxy-5α-pregnane-18-acid. The subsequent fractions contain mixtures of 2-bromide and unsaturated compounds, whereas from the fractions eluted with a mixture of benzene and ethyl acetate (9:1) 150 mg. of pure 18:20-lactone of $\Delta^4$-3-oxo-11α-acetoxy-20β-hydroxy-pregnene-18-acid melting at 184–186° C. are isolated.

The 2-bromo-compound used as starting material may be prepared as follows:

1.0 gram of the 18:20-lactone of 3-oxo-11α-acetoxy-20β-hydroxy-5α-pregnane-18-acid is dissolved in 10 ml. of glacial acetic acid, and 2.8 ml. of an 0.955-molar bromine solution in glacial acetic acid are added at 20–25° C. in the course of 10 minutes with stirring. When the addition is complete, stirring is continued for 10 minutes and the colorless reaction mixture is then poured into 200 ml. of water, the crystalline precipitate is suctioned off and rinsed well with water. By recrystallizing the dried crude product from ether there are obtained 1.01 grams of the 18:20-lactone of 2-bromo-3-oxo-11α-acetoxy-20β-hydroxy-5α-pregnane-18-acid melting at 195–196° C. (with decomposition); optical rotation $$[\alpha]_D = +20°$$

(in chloroform); infrared bands inter alia at 5.70μ (γ-lactone) 5.77μ (acetate and 3-ketone); 7.27μ, 8.14μ, 8.80μ, 9.80μ, 10.38μ and 10.41μ.

*Example 2*

2.0 grams of 18:20-lactone of 3-oxo-11α-acetoxy-20β-hydroxy-5α-pregnane-18-acid are dissolved in 10 ml. of glacial acetic acid and in the course of 5 minutes with stirring added dropwise to 5.4 ml. of an 0.953-molar bromine solution in glacial acetic acid. After another 5 minutes the reaction mixture is poured into 200 ml. of water and the crude monobromide separated by filtration. The faintly reddish filter residue is dissolved in methylene chloride, the solution washed with water, dried and evaporated in a water-jet vacuum. The residue is heated for 17 hours at 120° C. with stirring under nitrogen after the addition of 500 mg. of lithium carbonate in 20 ml. of a solution of 10% strength of lithium chloride in dimethylformamide. After cooling, the reaction solution is poured into a mixture of 200 ml. of water and 10 ml. of 2 N-sulfuric acid and the precipitate is suctioned off. Finally the filter residue is taken up in methylene chloride, the solution washed with water, dried and evaporated. The crystalline residue is dissolved in benzene, filtered through 10 grams of aluminum oxide, the column rinsed thoroughly with benzene and the benzene solution evaporated in a water-jet vacuum. The residue is crystallized from ether to yield 1.51 grams of crude crystallizate melting at 173-178° C. which in addition to the 18:20-lactone of Δ⁴-3-oxo-11α-acetoxy-20β-hydroxy-pregnene-18-acid contains also a small quantity of the 18:20-lactone of Δ¹-3-oxo-11α-acetoxy-20β-hydroxy-5α-pregnene-18-acid.

By careful chromatography on aluminum oxide there is obtained from the first fractions eluted with benzene the 18:20-lactone of Δ¹-3-oxo-11α-acetoxy-20β-hydroxy-5α-pregnene-18-acid melting at 188–193° C. Optical rotation $[\alpha]_D = +27.4°$, ultraviolet maximum at 231 mμ (ε=11100); infrared bands inter alia at 5.68μ, 5.75μ, 5.94μ, 6.18μ, 8.09μ, 8.74μ, 9.75μ and 10.46μ.

From the subsequent fractions the pure 18:20-lactone of Δ⁴-3-oxo-11α-acetoxy-20β-hydroxy-pregnene-18-acid melting at 186-187° C. is obtained; optical rotation $[\alpha]_D = +63°$ (in chloroform); ultraviolet maximum at 239 mμ (ε=15200).

In an analogous manner from the 18:20-lactone of 3-oxo-11α-propionyloxy-20β-hydroxy-5α-pregnane-18-acid the 18:20-lactone of Δ⁴-3-oxo-11α-propionyloxy-20β-hydroxy-pregnene-18-acid is obtained.

What is claimed is:

1. Process for the manufacture of an 18:20-lactone of a Δ⁴-3-oxo-11α-acyloxy-20-hydroxy-pregnene-18-acid, wherein an 18:20-lactone of a 2-bromo-3-oxo-11α-acyloxy-20-hydroxy-5α-pregnane-18-acid in which the acyloxy group is derived from a member selected from the group consisting of a lower aliphatic fatty acid and benzoic acid is heated with a lithium halide in a di-lower alkylformamide.

2. Process for the manufacture of an 18:20-lactone of a Δ⁴-3-oxo-11α-acyloxy-20-hydroxy-pregnene-18-acid, wherein an 18:20-lactone of a 2-bromo-3-oxo-11α-acyloxy-20-hydroxy-5α-pregnane-18-acid in which the acyloxy group is derived from a member selected from the group consisting of a lower aliphatic fatty acid and benzoic acid is heated with a lithium halide in a di-lower alkylformamide, with the addition of lithium carbonate.

3. Process as claimed in claim 1, wherein the 2-bromo-lactone is heated in dimethylformamide with lithium chloride to a temperature between about 100° C. and 150° C.

No references cited.